US009555777B2

United States Patent
Takei et al.

(10) Patent No.: US 9,555,777 B2
(45) Date of Patent: Jan. 31, 2017

(54) PARKING DEVICE FOR VEHICLE

(71) Applicant: AISIN AW CO., LTD., Anjo-shi, Aichi-ken (JP)

(72) Inventors: Tadamasa Takei, Nagoya (JP); Kenichi Naka, Anjo (JP); Akihito Iwata, Hekinan (JP)

(73) Assignee: AISIN AW CO., LTD., Aichi-ken (JP)

( * ) Notice: Subject to any disclaimer, the term of this patent is extended or adjusted under 35 U.S.C. 154(b) by 0 days.

(21) Appl. No.: 14/768,240

(22) PCT Filed: Mar. 26, 2014

(86) PCT No.: PCT/JP2014/058678
§ 371 (c)(1),
(2) Date: Aug. 17, 2015

(87) PCT Pub. No.: WO2014/157411
PCT Pub. Date: Oct. 2, 2014

(65) Prior Publication Data
US 2016/0001751 A1 Jan. 7, 2016

(30) Foreign Application Priority Data

Mar. 28, 2013 (JP) ................................. 2013-069696

(51) Int. Cl.
*B60T 7/02* (2006.01)
*B60T 1/06* (2006.01)
(Continued)

(52) U.S. Cl.
CPC ................ *B60T 1/062* (2013.01); *B60T 1/005* (2013.01); *B60T 1/06* (2013.01); *F16D 63/006* (2013.01); *F16H 63/34* (2013.01)

(58) Field of Classification Search
CPC ............ B60T 1/005; B60T 1/062; B60T 7/02; F16H 63/3416; F16H 63/3491; F16D 63/006; B60W 10/11; B60W 10/182
(Continued)

(56) References Cited

U.S. PATENT DOCUMENTS 7,934,590 B2 * 5/2011 Duhaime ............... F16H 63/483
192/219.5
2002/0084149 A1 * 7/2002 Heuver ................... B60T 1/005
188/69
(Continued)

FOREIGN PATENT DOCUMENTS

JP          61-7461 U       1/1986
JP       2008-2508 A        1/2008
(Continued)

OTHER PUBLICATIONS

International Search Report for PCT/JP2014/058678 dated Jul. 1, 2014.

*Primary Examiner* — Christopher Schwartz
(74) *Attorney, Agent, or Firm* — Sughrue Mion, PLLC

(57) ABSTRACT

A parking device for a vehicle has a parking rod which is movably driven from a position in which a parking gear is engaged to a position in which the engagement of the parking gear is released, a rotational lever which movably drives the parking rod, a drive device which rotationally drives the rotational lever, an elastic member which urges the rotational lever in a direction opposite from a direction in which the rotational lever is rotationally driven, and engagement device having an engaging portion in which the engaging portion is engaged with an engaged portion, in a position where the parking gear is engaged, which is provided at an end surface of the rotational lever which follows the radial direction of rotation.

10 Claims, 6 Drawing Sheets

(51) Int. Cl.
*F16H 63/34* (2006.01)
*B60T 1/00* (2006.01)
*F16D 63/00* (2006.01)

(58) Field of Classification Search
USPC ......... 188/67, 69, 152, 153, 265; 192/219.4, 192/219.5; 701/22, 48
See application file for complete search history.

(56) References Cited

U.S. PATENT DOCUMENTS

| | | | |
|---|---|---|---|
| 2008/0169168 A1* | 7/2008 | Nishimura | ........... F16H 63/3416 192/219.5 |
| 2014/0060994 A1* | 3/2014 | Burgardt | ............. F16H 63/3416 192/219.6 |
| 2014/0190784 A1* | 7/2014 | Yokota | ................ F16H 63/3416 192/219.5 |
| 2015/0025750 A1* | 1/2015 | Weslati | .................. B60W 10/11 701/48 |
| 2016/0123412 A1* | 5/2016 | Iwata | ...................... B60T 1/005 188/265 |

FOREIGN PATENT DOCUMENTS

| | | |
|---|---|---|
| JP | 2010-223329 A | 10/2010 |
| WO | 2010/109786 A1 | 9/2010 |

* cited by examiner

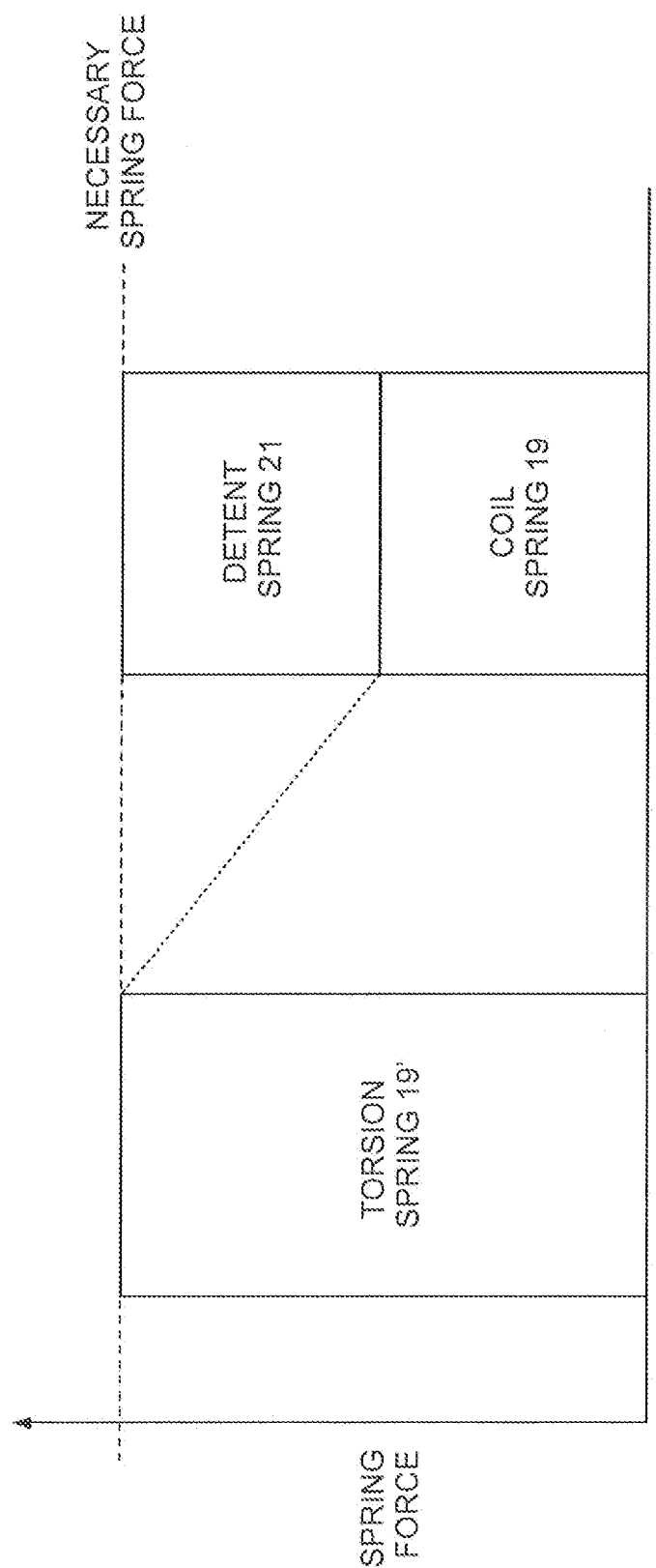

PARKING DEVICE FOR VEHICLE

CROSS REFERENCE TO RELATED APPLICATIONS

This application is a National Stage of International Application No. PCT/JP2014/058678 filed Mar. 26, 2014, claiming priority based on Japanese Patent Application No. 2013-069696 filed Mar. 28, 2013, the contents of all of which are incorporated herein by reference in their entirety.

TECHNICAL FIELD

The present subject matter relates to a parking device for a vehicle.

BACKGROUND ART

An automatic transmission and the like mounted on a vehicle is provided with a parking device that allows the vehicle to be in a parking state by regulating a rotation of an output shaft that transmits a rotation to a drive wheel or a rotation of an intermediate shaft configured to be able to transmit a rotation to the output shaft (Patent Document 1, for example).

The parking device in Patent Document 1 includes a parking gear that is integrally provided with the output shaft of the automatic transmission, a parking pawl having a tab that is engaged with a tooth space of the parking gear, a support disposed in proximity to the lower part of the parking pawl, a cam that oscillates the parking pawl vertically by being inserted and removed between the parking pawl and the support, a parking rod to which the cam is fitted by insertion, a rotational lever connected to one end of the parking rod which is opposite from the other end to which the cam is fitted by insertion, a torsion coil spring provided on the rotation shaft of the rotational lever, and a hydraulic piston of which the end is in contact with the rotational lever. The torsion coil spring urges the rotational lever so as to press the parking rod toward the parking gear, whereby the vehicle is in the parking state. With this urging force, the parking state is maintained. Due to the force from the hydraulic piston acting on the rotational lever, the rotational lever is rotated so as to pull the parking rod from the parking gear side while resisting to the urging force of the torsion coil spring, and the parking state is released.

RELATED-ART DOCUMENT

Patent Documents

[Patent Document 1] Japanese Patent Application Publication No. 2010-223329 (JP 2010-223329 A)

SUMMARY OF THE INVENTION

In the parking device described above, only the torsion coil spring bears a load generated when switching from the parking release state to the parking state, such as sliding resistance and the like of the piston. Therefore, the spring constant of the torsion coil spring is set such that a load exceeding all the loads, with regard to the displacement, is generated. Accordingly, the stress of the torsion coil spring during operation is large, and a problem of reliability may occur from the point of durability performance.

It is therefore an object to provide a parking device for a vehicle which can improve reliability of an elastic member used for maintaining and switching to the parking state.

In order to achieve the above object, in an embodiment, a parking device for a vehicle, including:

a parking rod which is movably driven from a position in which a parking gear is engaged to a position in which the engagement of the parking gear is released;

a rotational lever which movably drives the parking rod:

a drive device which rotationally drives the rotational lever;

an elastic member which urges the rotational lever in a direction opposite from a direction in which the rotational lever is rotationally driven; and engagement device having an engaging portion, in which the engaging portion is engaged with an engaged portion, in a position where the parking gear is engaged, the engaged portion being provided at an end surface of the rotational lever which follows the radial direction of rotation.

According to the present embodiment, a parking device for a vehicle which can enhance the reliability of an elastic member used for maintaining and switching to the parking state can be provided.

BRIEF DESCRIPTION OF THE DRAWINGS

FIG. 4 is a graph that indicates a load applied to a spring (a coil spring 19, a detent spring 21, a torsion coil spring 19'), in the parking state, which urges a rotational lever 15 of the parking device 2 according to the present embodiment and a rotational lever 15 of the parking device 2' according to the comparative example.

DESCRIPTION OF THE PREFERRED EMBODIMENT

Now, an embodiment will be described with reference to the accompanying drawings.

Figure 1B:
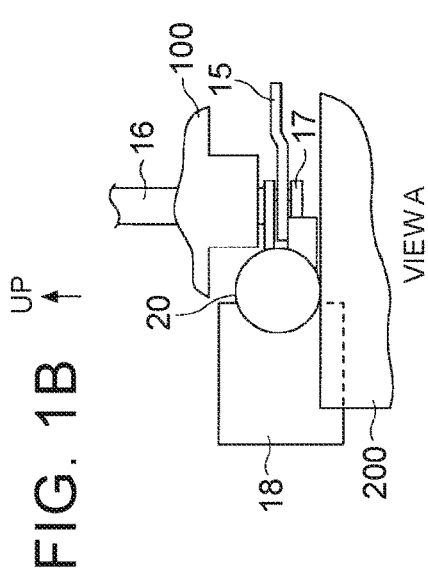
FIGS. 1A, 1B and 1C show drawings of a parking device 2 according to the present embodiment.
Figure 1C:
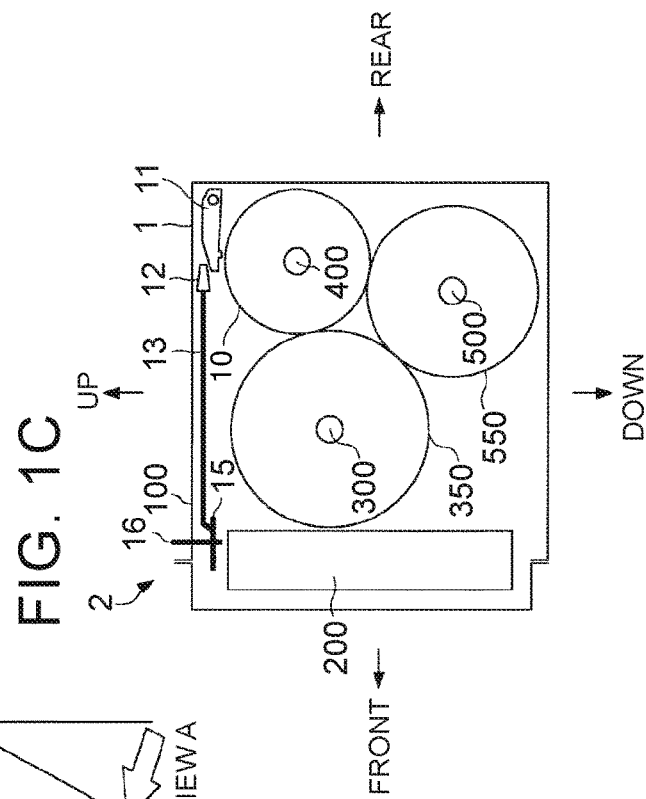
Figure 1A:
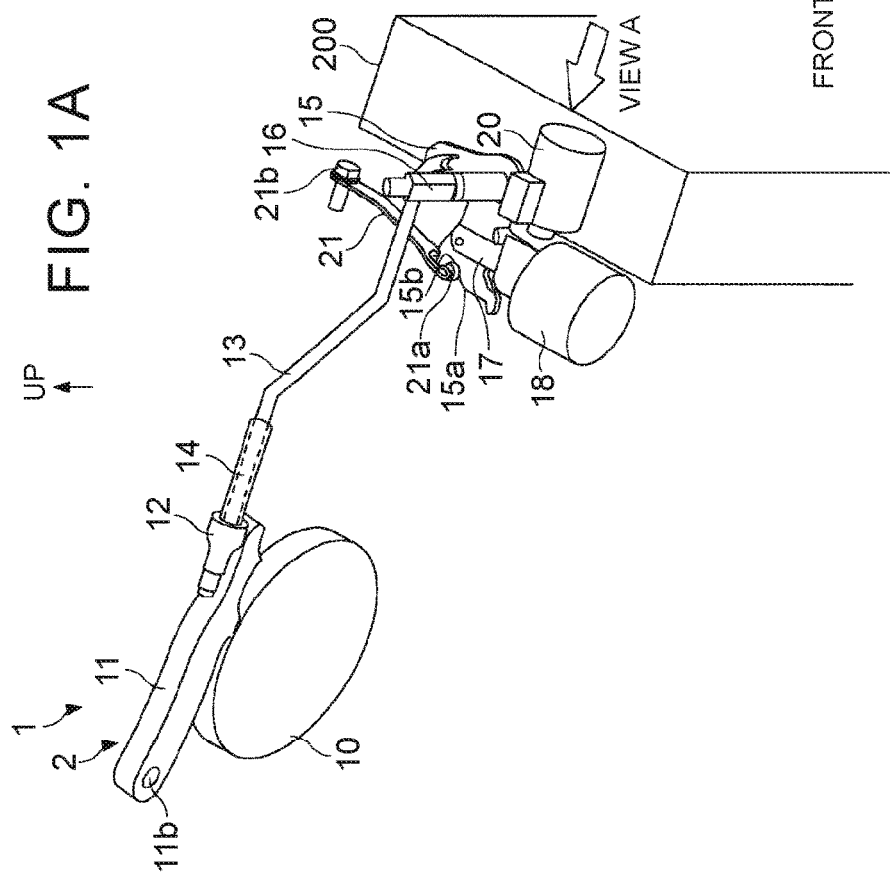

FIGS. 1A, 1B and 1C show drawings of a parking device 2 according to the present embodiment. FIG. 1A is a perspective view of the parking device 2. FIG. 1B is a view taken along an arrow A of FIG. 1A, which illustrates a positional relationship of the parking device 2, and a case 100 and a valve body 200 of an automatic transmission 1. FIG. 1C is a diagram that illustrates a positional relationship of the parking device 2 in the automatic transmission 1, which is a schematic sectional view in which the automatic transmission 1 is viewed from a side opposite from the side on which the automatic transmission 1 is connected to an engine. In the present embodiment, the side on which a rotational lever 15 and a solenoid actuator 20 of the parking device 2 are positioned is set to be the upper side as viewed from the valve body 200 for the purposes of explanation. In addition, the side on which the valve body 200 is positioned is set to be the front side as viewed from an input shaft 300, an intermediate shaft 400, and output shaft 500 which constitute the automatic transmission 1.

Figure 2A:
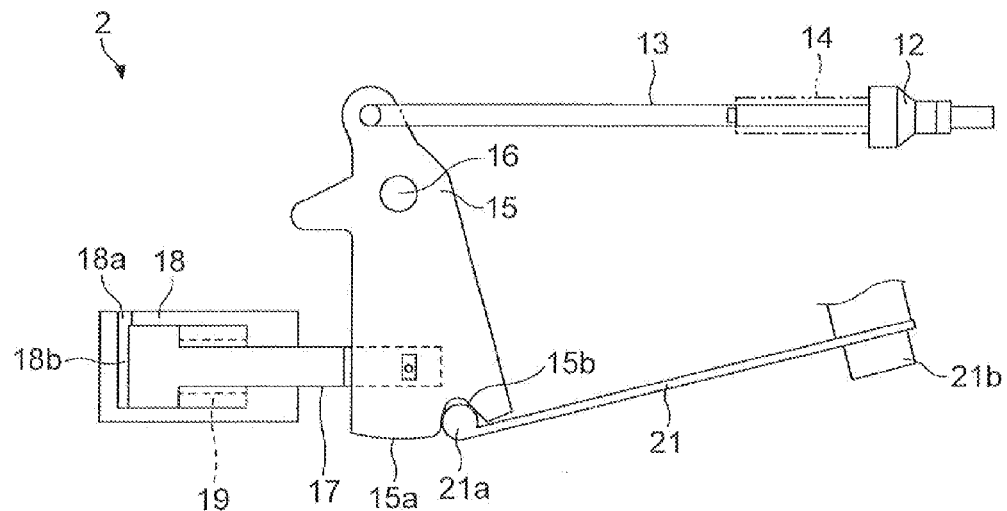
FIGS. 2A and 2B show diagrams that illustrate an operation of the parking device 2 according to the present embodiment.
Figure 2B:
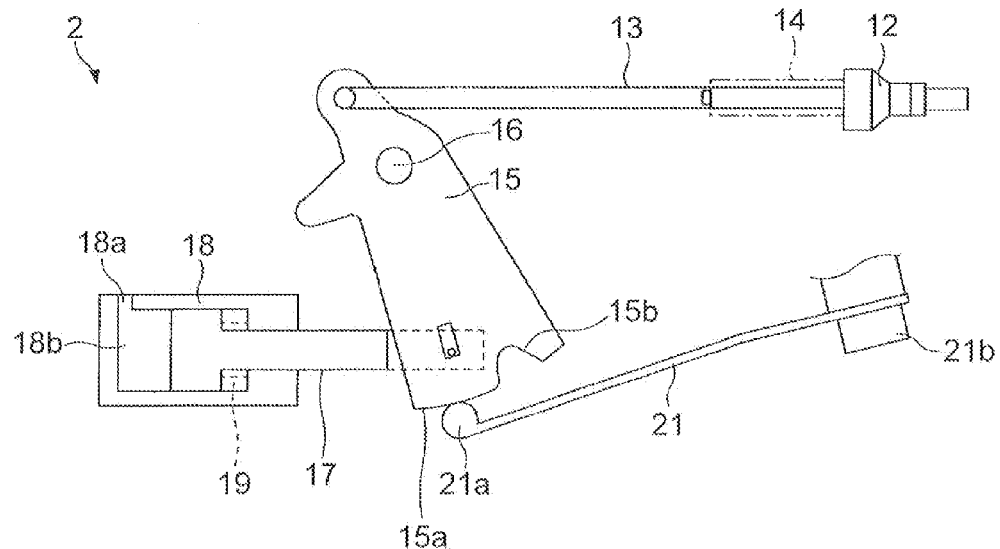

FIGS. 2A and 2B show diagrams that illustrate an operation of the parking device 2 according to the present embodiment. FIG. 2A shows a parking state, and FIG. 2B shows a parking release state. A sectional view of a hydraulic piston 17, a hydraulic cylinder 18, and a coil spring 19 is shown in order to illustrate an operation of the hydraulic piston 17 and the coil spring 19. A parking gear 10 and a parking pawl 11 are disposed in a direction into which a parking rod 13 and a cam 12 on the right of the figure are pressed (not shown).

The parking device 2 according to the present embodiment is structured so as to be assembled in the automatic transmission 1 as shown in FIG. 1C. In the automatic transmission 1, among a parking range, a neutral range, a drive range, a reverse range, and the like, the shift position is switched and shifting in accordance with the shift position is performed based on the shift signal from a shift lever (not shown) which can be selected by a driver. Specifically, this is called a shift-by-wire (SBW) method in which based on the shift signal, the shift control unit (not shown) controls a solenoid valve and the like in the valve body 200, whereby the shift position is switched and the shifting is performed. In the SBW method, the parking range described above can be selected not only by a shift lever but also by a button and the like.

The parking device 2 according to the present embodiment is structured so as to be controlled by the shift control unit (not shown) based on whether the shift position of the automatic transmission 1 is in the parking range or in other ranges than the parking range. That is, when the shift position is in the parking range, the parking device 2 is switched to the parking state and the parking state is maintained. When the shift position is in other ranges than the parking range, the parking device 2 is switched to the parking release state and the parking release state is maintained.

With reference to FIG. 1C, the automatic transmission 1 is structured by three shafts that are an input shaft 300 into which rotational drive force from the engine is input, an intermediate shaft 400 to which rotational drive force from the input shaft 300 is transmitted through a planetary gear and the like, and an output shaft 500 that outputs rotational drive force reduced or increased in speed through the intermediate shaft 400 to the drive wheel. A gear 350, a gear 10, and a gear 550 are provided on the input shaft 300, the intermediate shaft 400, and the output shaft 500, respectively, so as to be integral therewith, in order to shift or reduce the speed to allow difference in operation between right and left wheels. In front of these three shafts and the gears 350, 10, and 550 provided thereon, a valve body 200 constituted by a solenoid valve or a hydraulic circuit for shifting, etc. is disposed with its longitudinal side extending in the vertical direction. The parking device 2 is disposed in the comparatively limited area of the upper part in which the valve body 200, the input shaft 300, the intermediate shaft 400, the output shaft 500, the gears 350, 10, 550, and the like are disposed. The parking device 2 allows the vehicle to be in the parking state by regulating a rotation of the intermediate shaft 400 as described below.

With reference to FIG. 1A and FIGS. 2A and 2B, the parking device 2 is structured by a parking gear 10, a parking pawl 11, a cam 12, a parking rod 13, a rotational lever 15, a hydraulic piston 17, a coil spring 19, a solenoid actuator 20, a detent spring 21, and the like.

The parking gear 10 is provided so as to be integral with the intermediate shaft 400 of the automatic transmission. A plurality of grooves (tooth spaces) formed to recess in the radial direction is provided on the outer peripheral portion at equal intervals in the circumferential direction (not shown in FIG. 1A).

The parking pawl 11 is disposed so as to be able to swing around a pivot shaft 11b generally in the vertical direction. A tab 11a that can be engaged with the tooth space of the parking gear 10 is provided projecting from the lower side of the center part of the parking pawl 11. The pivot shaft 11b is provided with a torsion coil spring (not shown), and the parking pawl 11 is urged in a direction separated from the parking gear 10, which is the upper direction. This enables the parking pawl 11 not to be in contact with the parking gear 10 as long as the force from the cam 12 to be described later is not applied.

The distal end portion of the cam 12 is formed generally in the shape of a cone, which facilitates moving onto the upper surface of the parking pawl 11. The parking rod 13 is movably driven and the cam 12 moves onto the upper surface of the parking pawl 11, which swings the parking pawl 11 downward. In addition, the cam 12 is fitted by insertion to the distal end of the parking rod 13 so as to be slidable and restricted from moving to the distal end of the parking rod 13 by the predetermined amount or more.

The parking rod 13 has a distal end to which the cam 12 is fitted by insertion and a base end to which the rotational lever 15 is connected. The parking rod 13 can be moved generally in the axial direction as the rotational lever 15 is rotated. In addition, a coil spring 14 is provided compressed between the center portion of the parking rod 13 and the cam 12 so as to urge the cam 12 toward the distal end of the parking rod 13.

The rotational lever 15 is disposed so as to be rotatable around a shaft 16 which serves as rotation axis. In addition, the rotational lever 15 is connected to the base end of the parking rod 13 so that the parking rod 13 is movably driven by the rotation of the rotational lever 15. The rotational lever 15 is connected to the hydraulic piston 17, and is rotationally driven due to the reciprocating movement of the hydraulic piston 17. The rotational lever 15 has an end surface 15a that follows the radial direction of rotation, and which contacts an engagement protruding portion 21a of the detent spring 21 when the parking device 2 is in the parking release state, and has an engagement groove 15b with which the engagement protruding portion 21a of the detent spring 21 is engaged when the parking device 2 is in the parking state. The end surface 15a is formed in the shape of an arc centered on the rotation axis as viewed from a direction in which the rotation axis of the rotational lever 15 extends.

With reference to FIGS. 2A and 2B, the hydraulic piston 17 is connected to the rotational lever 15 and is moved by the hydraulic pressure supplied from a hydraulic supply port 18a to a hydraulic chamber 18b provided between the hydraulic piston 17 and a hydraulic cylinder 18 so as to rotationally drive the rotational lever 15. The hydraulic piston 17 has a portion with the outer diameter smaller than the hydraulic cylinder 18, and the coil spring 19 is provided at the portion with the smaller outer diameter.

The coil spring 19 is provided so as to store the energy (be compressed) as the hydraulic piston 17 is moved by the hydraulic pressure supplied to the hydraulic chamber 18b. When the supply of the hydraulic pressure to the hydraulic chamber 18b is stopped and the hydraulic pressure decreases, the hydraulic piston 17 is moved in a direction opposite from that in the case where the hydraulic pressure is supplied. Accordingly, the rotational lever 15 connected to the hydraulic piston 17 is also rotationally driven by the urging force of the coil spring 19.

A solenoid actuator 20 is provided so as to maintain, without depending on the supply of the hydraulic pressure, the state in which the hydraulic piston 17 has been moved by the hydraulic pressure supplied to the hydraulic chamber 18b of the hydraulic cylinder 18. Accordingly, the hydraulic pressure need not be supplied in order to maintain the state in which the hydraulic piston 17 is moved, which enables fuel efficiency to be improved. With the current flowing through the solenoid actuator 20, the position of the hydraulic piston 17 is fixed by a protruding movable shaft that is fitted in a recess (not shown) provided at the hydraulic piston 17. In the present embodiment, the solenoid actuator 20 maintains the parking release state. However, the parking release state may be maintained by continuously supplying the hydraulic pressure to the hydraulic chamber 18b of the hydraulic cylinder 18.

The detent spring 21 is a plate-shaped elastic member, and for example, a leaf spring including a spring steel, etc. The base end of the detent spring 21 is fixed to the case 100 and the like of the automatic transmission 1 with a bolt 21b. The distal end of the detent spring 21 has the engagement protruding portion 21a. The engagement protruding portion 21a contacts the end surface 15a of the rotational lever 15 which follows the radial direction of rotation while the parking device 2 is in the parking release state, and is engaged with an engagement groove 15b provided at the end surface of the rotational lever 15 which follows the radial direction of rotation while the parking device 2 is in the parking state. During the parking release state, the engagement protruding portion 21a is urged against the end surface 15a by the elastic force of the plate-shaped elastic member in a direction toward the rotational center of the rotational lever 15. During the parking state, with this urging force, the engagement protruding portion 21a is pressed into the engagement groove 15b so as to be engaged with the engagement groove 15b. The engagement protruding portion 21a, for example, may be formed so as to be integral with the leaf spring which is a plate-shaped elastic member by bending the end of the leaf spring, or another protrusion-shaped part may be bonded to the plate-shaped elastic member.

Next, an operation of the parking device 2 will be described.

With reference to FIG. 2A, the position of the rotational lever 15 is retained by the elastic force (urging force) of the engagement protruding portion 21a of the detent spring 21 engaged with the engagement groove 15b of the rotational lever 15 and the elastic force (urging force) of the coil spring 19 provided in the hydraulic cylinder 18, and thus the parking state is maintained. At this time, the cam 12 moves onto the upper surface of the parking pawl 11 to be disposed on the right side of the figure, whereby the parking pawl 11 moves downward based on the pivot shaft 11b as the center, and the tab 11a of the parking pawl 11 is engaged with the tooth space of the parking gear 10. Accordingly, the rotation of the intermediate shaft 400 with which the parking gear 10 is integrally provided is regulated, and the parking state of the vehicle is achieved.

With reference to FIG. 2B, the hydraulic pressure is supplied from the hydraulic supply port 18a to the hydraulic chamber 18b of the hydraulic cylinder 18. By the hydraulic piston 17 that was moved by the hydraulic pressure, the position of the rotational lever 15 is retained, and the parking release state is maintained. The hydraulic piston 17 is moved up to the position as illustrated in the figure by the hydraulic pressure to be supplied. The position of the rotational lever 15, as described above, is retained by fitting the movable shaft of the solenoid actuator 20 (not shown in FIG. 2B) in the recess of the hydraulic piston 17. At this time, the cam 12 does not move onto the upper surface of the parking pawl 11 to be disposed on the right side of the figure, and by the urging force of the torsion coil spring provided at the pivot shaft 11b of the parking pawl 11, the parking gear 10 and the parking pawl 11 are separated from each other. Thus, the parking release state is achieved.

When the shift position is moved to other ranges than the parking range, the hydraulic pressure is supplied to the hydraulic chamber 18b of the hydraulic cylinder 18 based on the control signal from the shift control unit (not shown). The hydraulic piston 17, while compressing the coil spring 19, is moved from the state shown in FIG. 2A to the right side in the figure by the hydraulic pressure supplied. As the hydraulic piston 17 is moved, the rotational lever 15 connected to the hydraulic piston 17 is rotated in the counter-clockwise direction in the figure, and the engagement protruding portion 21a of the detent spring 21 engaged with the engagement groove 15b of the rotational lever 15 is disengaged from the engagement groove 15b, and contacts the end surface 15a. As the rotational lever 15 is rotated, the parking rod 13 connected to the rotational lever 15 is moved to the left side in the figure. Accordingly, the parking device 2 is switched from the parking state shown in FIG. 2A to the parking release state shown in FIG. 2B. The engagement protruding portion 21a of the detent spring 21 is formed in a sufficiently smooth curved shape so as to be disengaged from the engagement groove 15b with a predetermined load. Further, the engagement groove 15b is also formed in a sufficiently smooth curved shape similarly to the engagement protruding portion 21a.

When the shift position is moved from other ranges than the parking range to the parking range, the supply of electric current to the solenoid actuator 20 is stopped based on the control signal from the shift control unit (not shown), and the retained position of the hydraulic piston 17 is released. Since the hydraulic pressure is not supplied to the hydraulic chamber 18b of the hydraulic cylinder 18, the hydraulic piston 17 is moved to the left side in the figure by the urging force of the coil spring 19 in which energy is stored. As the hydraulic piston 17 is moved by the urging force of the coil spring 19, the rotational lever 15 connected to the hydraulic piston 17 is rotated in the clockwise direction in the figure. As the rotational lever 15 is operated, the parking rod 13 connected to the rotational lever 15 is moved to the right side in the figure. The engagement protruding portion 21a of the detent spring 21 which contacts the end surface 15a of the rotational lever 15 slides on the end surface 15a as the rotational lever 15 is rotated, and, during the parking state, the engagement protruding portion 21a is engaged with the engagement groove 15b of the rotational lever 15. Accordingly, the parking device 2 is switched from the parking release state shown in FIG. 2B to the parking state shown in FIG. 2A. As described above, the engagement protruding portion 21a and the engagement groove 15b are formed in a sufficiently smooth curved shape in consideration of a load applied when the engagement protruding portion 21a is disengaged from the engagement groove 15b. However, a portion other than the side where the engagement protruding portion 21a is disengaged from the engagement groove 15b may be formed in such a shape that the engagement is not easily released, in order to maintain the parking state. That is, the portion of the engagement groove 15b, which is formed in other directions than the direction in which the engagement protruding portion 21a is disengaged from the engagement groove 15b, may not be formed in a smooth curved shape.

Next, an effect of the parking device 2 according to the present embodiment will be described.

Figure 3A:
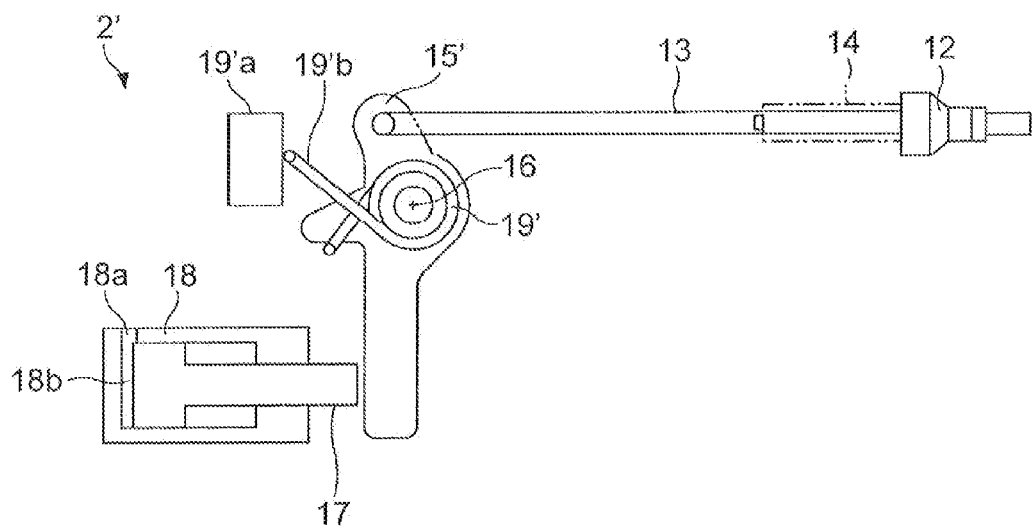
FIGS. 3A and 3B show diagrams that illustrate an operation of a parking device 2' according to a comparative example (related art).
Figure 3B:
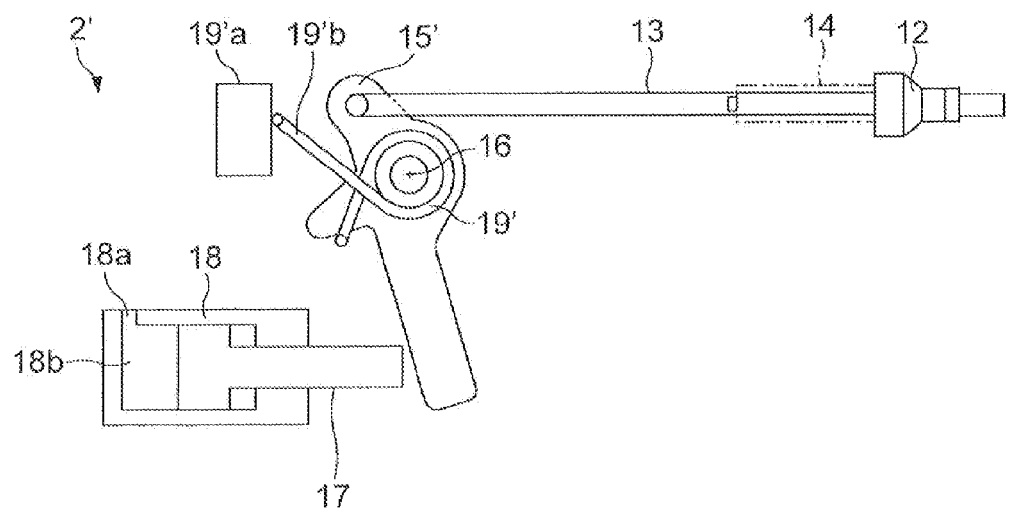

FIGS. 3A and 3B show diagrams that illustrate an operation of a parking device 2' according to a comparative example. FIG. 3A shows a parking state, and FIG. 3B shows a parking release state. The parking device 2' according to the comparative example does not include the coil spring 19 in the hydraulic cylinder 18 and the detent spring 21. Instead, a torsion coil spring 19' is provided around a shaft 16, which is different from the parking device 2 according to the present embodiment.

With reference to FIGS. 3A and 3B, the parking device 2' according to the comparative example is switched from the parking release state to the parking state, and the parking state is maintained only by the torsion coil spring 19'. Specifically, with reference to FIG. 3B, in the parking release state, as the rotational lever 15 is rotated by the hydraulic piston 17, the movement of one end 19'b of the torsion coil spring 19' is regulated by a fixed portion 19'a, and energy is stored in the torsion coil spring 19'. When the parking release state is switched to the parking state, the rotational lever 15 is rotated in the clockwise direction by the urging force of the torsion coil spring 19' in which energy is stored. Thus, the parking device 2' is switched to the parking state to be maintained as shown in FIG. 3A.

In comparison, the parking device 2 according to the present embodiment is switched from the parking release state to the parking state, and the parking state is maintained by two springs, which is the coil spring 19 and the detent spring 21.

Here, FIG. 4 shows a bar graph that indicates a load applied to the torsion coil spring 19' of the parking device 2' according to the comparative example in the parking state and a load applied to the coil spring 19 and the detent spring 21 according to the present embodiment in the parking state.

As shown by the bar on the left in FIG. 4, the torsion coil spring 19' of the parking device 2' according to the comparative example needs to bear all the loads for maintaining the parking state. Therefore, the operating stress of the torsion coil spring 19' becomes large, which may result in problems of reliability from the point of durability performance.

In comparison, the coil spring 19 and the detent spring 21 of the parking device 2 according to the present embodiment can bear the load necessary to maintain the parking state by sharing the load, as shown in the bar on the right in FIG. 4. Accordingly, a load applied to each of the coil spring 19 and the detent spring 21 is smaller, which can enhance the reliability of the parking device 2 from the point of durability performance.

With reference to FIG. 1C, the parking device 2 is disposed in the comparatively limited area which is the upper part of the automatic transmission 1. Particularly, with reference to FIG. 1B, major parts of the parking device 2 such as the rotational lever 15 are disposed in proximity with each other between the valve body 200 and the upper inner surface of the case 100 of the automatic transmission 1. Here, when one spring provides functions of urging for switching to and maintaining the parking state, the spring needs to bear (generate) a large load. Therefore, the size of the spring needs to be increased. For example, the parking device 2' according to the comparative example includes a torsion coil spring 19' provided around the rotation axis (shaft 16) of the rotational lever 15. When one torsion coil spring 19' provides functions of urging for switching to and maintaining the parking state, the size of the torsion coil spring 19' is increased. This also increases the dimension of the rotational lever 15 in a direction of the rotation axis (shaft 16), whereby a problem may occur when the parking device 2' is disposed between the case 100 and the valve body 200. In the parking device 2 according to the present embodiment, when only the coil spring 19 provides functions of urging for switching to and maintaining the parking state without using the detent spring 21, the size of the coil spring 19 is increased similarly. This also increases the size of the hydraulic cylinder 18, which may cause a problem when the parking device 2 is disposed between the case 100 and the valve body 200.

In comparison, in the parking device 2 according to the present embodiment, two springs (coil spring 19 and the detent spring 21) provide functions of urging for switching to and maintaining the parking state, whereby the size of each spring can be reduced. Therefore, the parking device 2 according to the present embodiment is easily disposed in a limited space between the upper inner surface of the case 100 and the valve body 200 of the automatic transmission 1.

Figure 5A:
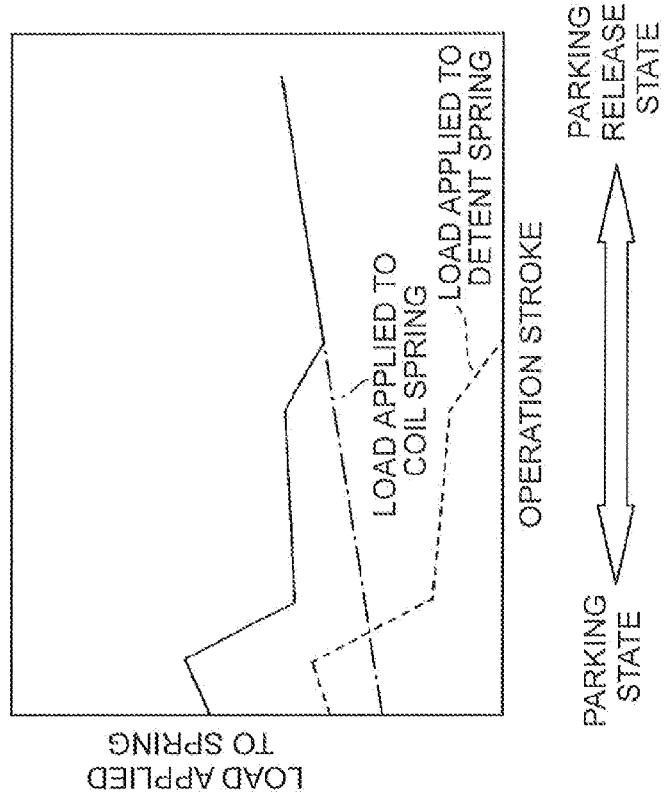
FIGS. 5A and 5B are graphs that illustrate an effect of the detent spring 21 according to the present embodiment.
Figure 5B:
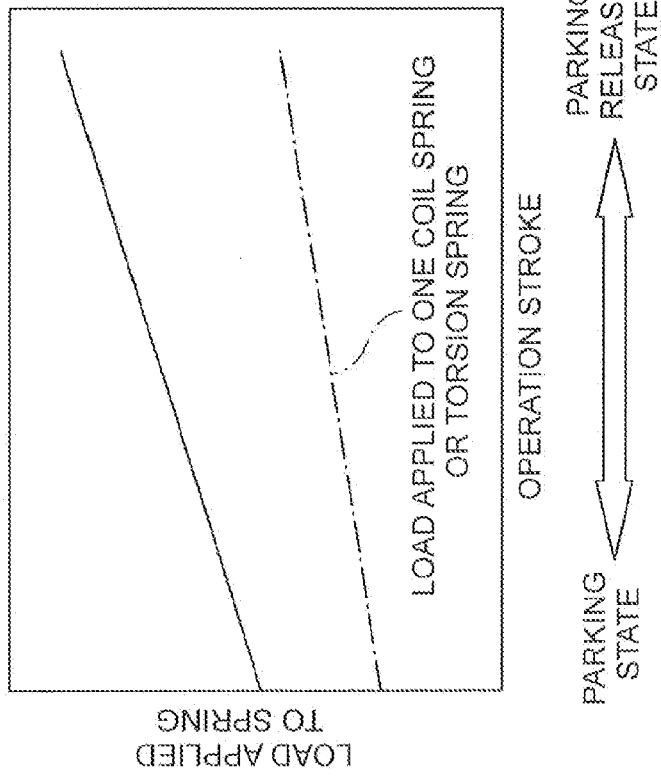

FIGS. 5A and 5B show graphs in which total loads applied to two springs are compared between when the detent spring 21 is not assembled and when the detent spring 21 is assembled, in the case where two springs are adopted to generate the urging force to switch to and maintain the parking state. Specifically, FIG. 5A illustrates a total load (a solid line in the figure) applied to two springs when switching to and maintaining the parking state are achieved by two coil springs, two torsion springs, or a coil spring and a torsion spring. FIG. 5B illustrates a total load (a solid line in the figure) applied to two springs when switching to and maintaining the parking state are achieved by the coil spring 19 and the detent spring 21.

With reference to FIG. 5A, when the detent spring 21 is not assembled, the total load applied to the two springs in the parking release state is extremely large in order to generate a load for maintaining the parking state.

In comparison, when the detent spring 21 is assembled, with reference to FIG. 5B, a load for maintaining the parking state is equivalent to or larger than that shown in FIG. 5A, but a load in the parking release state is equivalent to that applied to one coil spring. This is because the detent spring 21 hardly generates the force urging the rotational lever 15 in the rotational direction, since the end surface 15a of the rotational lever 15 which contacts the engagement protruding portion 21a of the detent spring 21 in the parking release state is formed in an arc shape as viewed from the direction in which the rotation axis of the rotational lever 15 extends. By adopting the detent spring 21, a load applied to the two springs for maintaining the parking state can be maintained larger while a load applied to the two springs in the parking release state can be made smaller. Accordingly, the hydraulic pressure to be supplied to the hydraulic chamber 18b of the hydraulic cylinder 18 can be reduced when switching from the parking state to the parking release state, whereby fuel efficiency can be improved. In addition, because a load applied to the movable shaft of the solenoid actuator 20 for maintaining the parking state can be reduced, the reliability can be enhanced from the point of durability performance.

When the shift lever is shifted to the parking range by mistake while the vehicle is running, for example, the tooth space of the parking gear 10 and the tab 11a of the parking pawl 11 cannot be engaged with each other because the parking gear 10 is rotating. Therefore, the parking pawl 11 moved downward by the cam 12 contacts the parking gear 10 which is rotating, and is bounded upward with the reaction force.

Here, when the detent spring 21 is not assembled, the cam 12 is bounded in a direction away from the parking pawl 11, and the reaction force is transmitted to the hydraulic piston 17 through the coil spring 14, the parking rod 13, and the rotational lever 15. Therefore, abrasion and the like are generated on the sliding surface between the hydraulic piston 17 and the hydraulic cylinder 18 with the transmitted reaction force, which may cause a problem in terms of durability.

In comparison, when the detent spring 21 is assembled, the reaction force acting on the cam 12 bounded is transmitted to the coil spring 14, the parking rod 13, and the rotational lever 15 similarly, and the most of the reaction force is transmitted to the detent spring 21 as a load. Therefore, by assembling the detent spring 21, abrasion and the like on the sliding surface between the hydraulic piston 17 and the hydraulic cylinder 18 can be suppressed, whereby the reliability can be enhanced from the point of durable performance.

The above embodiment was used to describe a particular mode but the subject matter is not particularly limited to such a specific embodiment, and various modifications and changes are possible.

Figure 6A:
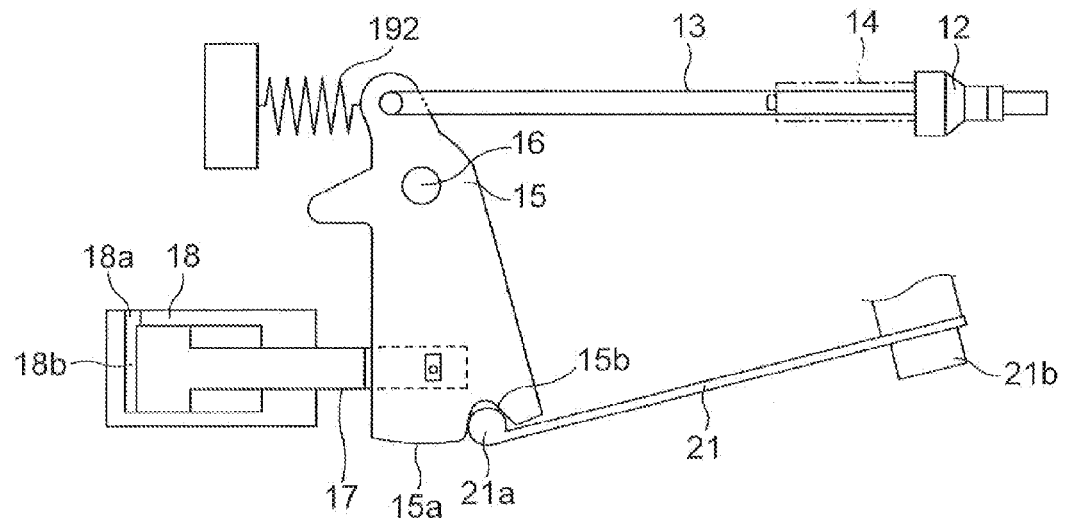
FIGS. 6A and 6B are figures showing a modified example of the parking device 2 according to the present embodiment.
Figure 6B:
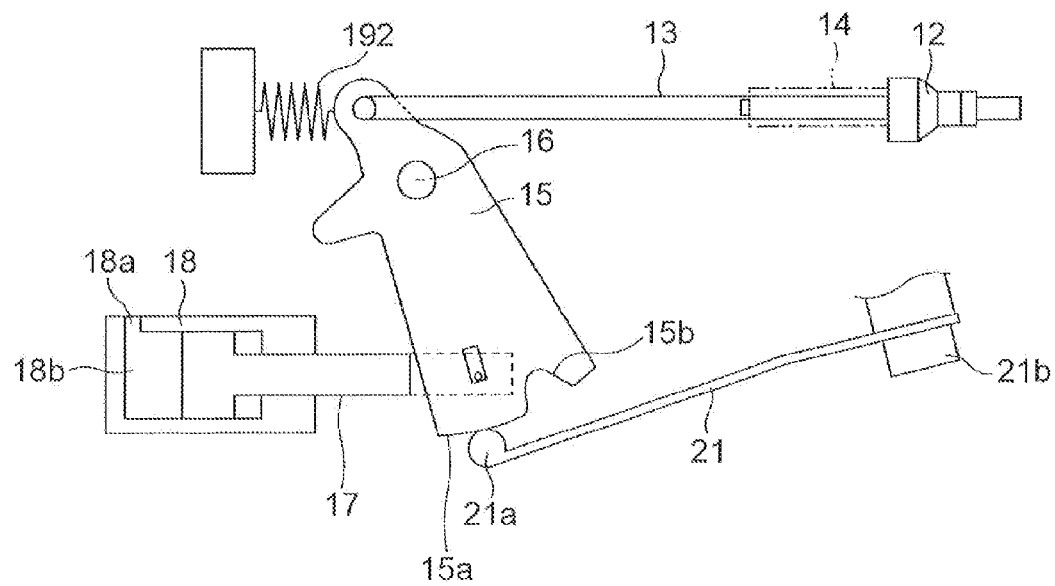

FIGS. 6A and 6B illustrate a modified example of the parking device 2 according to the present embodiment. FIG. 6A shows a parking state, and FIG. 6B shows a parking release state. In the modified example, the coil spring 19 provided in the hydraulic cylinder 18 is replaced with a coil spring 192 disposed in proximity to the part of the rotational lever 15 which is connected to the parking rod 13. In the coil spring 192, energy is stored as the hydraulic piston 17 is moved by the supplied hydraulic pressure, similarly to the coil spring 19. The coil spring 192 in which the energy is stored urges the rotational lever 15 to be rotated when the parking release state is switched to the parking state. In addition, the coil spring 192 generates the urging force for maintaining the parking state. Therefore, similar effects with the effects of the parking device 2 according to the present embodiment can be obtained.

According to the present embodiment, in addition, the coil spring 19 is used. However, in the case where no problems occur when disposing a torsion coil spring in the automatic transmission 1, the torsion coil spring used for the parking device 2' according to the comparative example may be used instead.

According to the present embodiment, in addition, the rotational lever 15 has the engagement groove 15b, and the detent spring 21 has the engagement protruding portion 21a. In the parking state, the engagement protruding portion 21a is engaged with the engagement groove 15b, but a reverse structure of the structure described above is also acceptable. That is, a protrusion-shaped engagement portion is provided at the end surface of the rotational lever, and a groove-shaped engagement portion is provided at the distal end of the detent spring. In the parking state, these engagement portions may be engaged with each other.

According to the present embodiment, the parking device 2 is incorporated into the automatic transmission 1. However, the present subject matter is not limited to this embodiment, and the parking device 2 may be incorporated into a continuously variable transmission (CVT) or a hybrid drive apparatus.

DESCRIPTION OF THE REFERENCE NUMERALS

1 AUTOMATIC TRANSMISSION
2 PARKING DEVICE (PARKING DEVICE FOR VEHICLE)
10 PARKING GEAR
13 PARKING ROD
15 ROTATIONAL LEVER
15a END SURFACE
15b ENGAGEMENT GROOVE (ENGAGED PORTION)
17 HYDRAULIC PISTON (DRIVE DEVICE)
19 COIL SPRING (ELASTIC MEMBER)
21 DETENT SPRING (ENGAGEMENT DEVICE)
21a ENGAGEMENT PROTRUDING PORTION (ENGAGING PORTION)
100 CASE
200 VALVE BODY

The invention claimed is:

1. A parking device for a vehicle, comprising:
a parking rod which is movably driven from a position, corresponding to a parking state, in which a parking gear is engaged to a position, corresponding to a parking released state, in which the engagement of the parking gear is released;
a rotational lever which movably drives the parking rod between the position where the parking gear is engaged and the position where the parking gear is released;
a drive device which rotationally drives the rotational lever in a first rotational direction such that the rotational lever drives the parking rod from the position where the parking gear is engaged to the position where the parking gear is released;
an elastic member which is configured move the parking device from the parking release state to the parking state by urging the rotational lever in a second rotational direction opposite from the first rotational direction; and
an engagement device having an engaging portion, wherein
the engaging portion is engaged with an engaged portion, in the parking state, the engaged portion being provided at an end surface of the rotational lever which follows the radial direction of rotation.

2. The parking device for a vehicle according to claim 1, wherein
the engaging portion urges the rotational lever in a direction toward the rotational center of the rotational lever, and urges the rotational lever in the first rotating direction from a position in which the rotational lever starts to be urged from a parking released state.

3. The parking device for a vehicle according to claim 2, wherein
the engaging portion is a protrusion provided at a distal end of a plate-shaped elastic member,
the engaged portion is a groove,
the plate-shaped elastic member is a detent spring which urges the protrusion that is engaged with the groove, in the position where the parking gear is engaged, in a direction toward the rotational center of the rotational lever.

4. The parking device for a vehicle according to claim 3, wherein
the end surface of the rotational lever is formed in an arc shape centered on rotation axis as viewed from a direction in which the rotation axis of the rotational lever extends.

5. The parking device for a vehicle according to claim 4, wherein
the drive device is a hydraulic piston which rotationally drives the rotational lever such that the parking rod is moved by the hydraulic pressure from the position in which the parking gear is engaged to the position in which the engagement of the parking gear is released.

6. The parking device for a vehicle according to claim 5, wherein
the elastic member is a coil spring provided inside a cylinder member into which the hydraulic piston is inserted, and is provided so as to store the energy as the hydraulic piston is moved by the hydraulic pressure.

7. The parking device for a vehicle according to claim 6, wherein
at least a part of the rotational lever including a rotation shaft portion of the rotational lever is disposed between an inner surface of a case of an automatic transmission and a valve body which constitutes a hydraulic circuit of the automatic transmission in proximity with each other.

8. The parking device for a vehicle according to claim 1, wherein
the engaging portion is a protrusion provided at a distal end of a plate-shaped elastic member,
the engaged portion is a groove,
the plate-shaped elastic member is a detent spring which urges the protrusion that is engaged with the groove, in the position where the parking gear is engaged, in a direction toward the rotational center of the rotational lever.

9. The parking device for a vehicle according to claim 1, wherein
the drive device is a hydraulic piston which rotationally drives the rotational lever such that the parking rod is moved by the hydraulic pressure from the position in which the parking gear is engaged to the position in which the parking gear is released.

10. The parking device for a vehicle according to claim 1, wherein
at least a part of the rotational lever including a rotation shaft portion of the rotational lever is disposed between an inner surface of a case of an automatic transmission and a valve body which constitutes a hydraulic circuit of the automatic transmission in proximity with each other.

* * * * *